US005950626A

United States Patent [19]
Wagener et al.

[11] Patent Number: 5,950,626
[45] Date of Patent: Sep. 14, 1999

[54] THERAPEUTIC DEVICE FOR ABSORBING VIBRATIONS ACTING ON A HUMAN BODY

[76] Inventors: Claus Wagener, Leonrodstr, 47, D-90599 Dietenhofen; Markus Walther, Gertrud-von-le-Fort-Str, 7, Würzburg, both of Germany

[21] Appl. No.: 09/076,653

[22] Filed: May 12, 1998

[30] Foreign Application Priority Data

Aug. 29, 1997 [DE] Germany ................. 197 37 733

[51] Int. Cl.[6] ................................. A61F 5/37

[52] U.S. Cl. ................................. 128/846; 128/882

[58] Field of Search ................... 128/845, 846, 128/878, 879, 882; 5/636–649

[56] References Cited

U.S. PATENT DOCUMENTS

| | | | |
|---|---|---|---|
| 4,349,925 | 9/1982 | Macomber | 5/431 |
| 5,269,322 | 12/1993 | Mandel | 128/845 |
| 5,573,014 | 11/1996 | Ginter | 128/845 |

FOREIGN PATENT DOCUMENTS 0197771  10/1986  European Pat. Off. .

Primary Examiner—Michael A. Brown
Attorney, Agent, or Firm—Anderson, Kill & Olick, P.C.

[57] ABSTRACT

A therapeutic device for absorbing vibrations acting on a region of a human body and including at least one vibration-absorbing pillow formed of a synthetic compound resistant to an elastic compression and having a Shore hardness of 0.5–4.

4 Claims, 1 Drawing Sheet

THERAPEUTIC DEVICE FOR ABSORBING VIBRATIONS ACTING ON A HUMAN BODY

BACKGROUND OF THE INVENTION

1. Field of the Invention

The present invention relates to a therapeutic device for absorbing vibration acting on a region of a human body and including a pillow formed of a vibration-absorbing material.

2. Description of the Prior Art

European Patent No. 97,771 (EP-PS 0197771) discloses a device of the above-described type in which the pillow is formed of a material having a viscosity from 100,000 to 1,000,000 Saybolt Universal Second Units at 38° C. and a continuous fluid phase with a solid, finely divided filler material dispersed therein. The liquid material is contained in a fluid-proof cover. The cover should not only be fluid-proof but should also be adapted to the actions and characteristics of the pillow material.

The healing and protective action of the known device on a region of a human body is not sufficiently sensitive.

Accordingly, an object of the present invention is to provide a therapeutic device of the above-described type having improved healing and protective functions.

SUMMARY OF THE INVENTION

This and other objects of the present invention, which will become apparent hereinafter, are achieved by forming the pillow of a material resistant to an elastic compression and having a Shore hardness of 0.5–4.

The pillow material, being resistant to the elastic compression, is not fluidal and, as experiments have shown, significantly improves the healing and protective function of the device. E.g., a biamechanical pattern for measuring stresses, which are caused in a region of a human body, e.g., in the region of an elbow joint, by vibration and acceleration under application of a standard load, shows that with the use of the device according to the present invention, a 20% greater stress reduction is achieved than with the use of the known device.

The human body is build of muscles, tendons, tissue. Under a load, it absorbs longitudinal and transverse waves produced by the load, which is prevented by the pillow covering a region of the body. The device according to the present invention is provided with retaining means for keeping the pillow in contact with the skin surface of the body region. Generally, the pillow is arranged on the inner surface of the retaining means.

In the device according to the present invention, the pillow does not need to be surrounded by a cover, in particular, by a liquid-proof cover, in order to retain its shape and function. However, generally, in the device according to the present invention, the pillow is surrounded by a cover which is made of a material favorably compatible with the skin.

According to one embodiment of the present invention, the synthetic compound of which the pillow is formed is interspersed with particles of a filler material. However, it is preferable that the pillow material be free from particles of a filler material. The filler material is not necessary for the improved healing and protective functioning of the device according to the present invention. Moreover, the filler material can adversely affect the intended function of the inventive device.

It is particular advantageous when the synthetic compound, which is used for making the pillow, is formed of a vulcanized silicone rubber compound consisting of a silicone rubber, hardener and oil. The silicone rubber may be formed as a moldable, vulcanized at a room temperature rubber on the basis of polydimethylsiloxane, the oil is also selected on the basis of polydimethylsiloxane, and the hardener is formed on the basis of tetrapropylortosilicate. The pillow is produced by molding.

It is particularly advantageous when the synthetic compound is a foam plastic formed as a thermoplastic compound on the basis of a styrene-ethylene-butylene-styrene-blockcopolymers. These pillows are produced by injection molding which is associated with reduced manufacturing costs. This porous foam plastic is resistant to elastic compression and has a Shore hardness of 0.5–4.

BRIEF DESCRIPTION OF THE DRAWINGS

The features and objects of the present invention will become more apparent, and the invention itself will be best understood from the following detailed description of the preferred embodiments when read with reference to the accompanying drawings, where.

DETAILED DESCRIPTION OF THE PREFERRED EMBODIMENT

Figure 1:
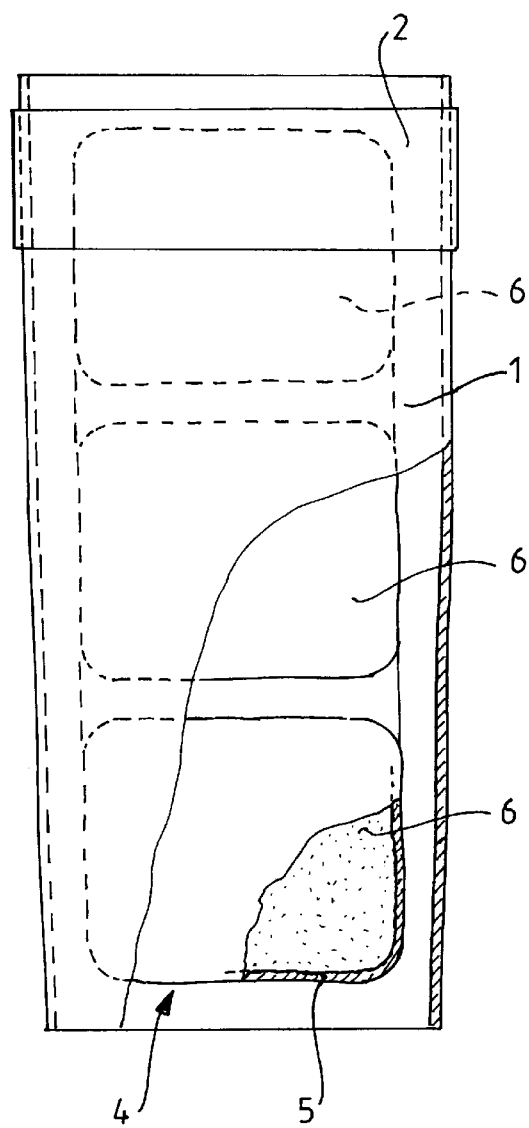
FIG. 1 is a plan view with a cut-out of therapeutic device according to the present invention for absorbing vibrations acting on a region of a human body.
Figure 2:
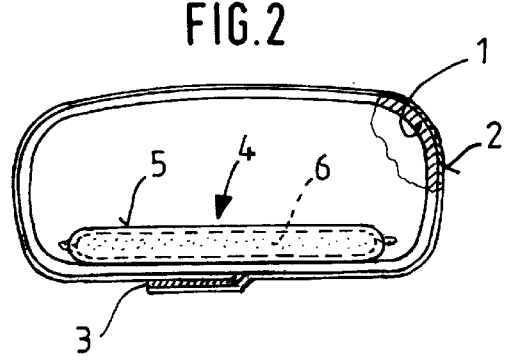
FIG. 2 is a side partially cross-sectional view of the device shown in FIG. 1.

A vibration-absorbing device according to the present invention is shown in FIGS. 1–2. The device has a retaining member 1 which is formed as a hose section of an elastically stretchable material. At one of the opposite ends of the retaining members, there is provided a belt strap 2. One end of the belt strap 2 is permanently attached to the retaining member 1. The other end of the belt strap 2 is provided with a VELCRO®-type fastener 3 for being releasably connected with the fixed end. The belt strap 2 surrounds the retaining member 1, as can particularly be seen in FIG. 2. A pillow member 4 is glued to the inner surface of the retaining member 1. The pillow member 4 extends along almost the entire length of the retaining member 1 and occupies less than half of the width of the retaining member 1. The pillow member 4 is formed of a cover 5 and a pillow means 6. The cover 5 extends over the entire length and almost over the entire width of the retaining member 1 and covers three spaced from each other pillows 6. The hose-shaped retaining member 1 surrounds a predetermined region of a human body and keeps the pillow member 4 in contact with the skin surface of the predetermined body region. The retaining member 1 is secured to the predetermined body region with the belt strap 2.

Though the present invention was shown and described with references to the preferred embodiments, various modifications thereof will be apparent to those skilled in the art and, therefore, it is not intended that the invention be limited to the disclosed embodiments or details thereof, and departure can be made therefrom with in the spirit and scope of the appended claims.

What is claimed is:

1. A therapeutic device for absorbing vibration acting on a region of a human body, comprising a vibration absorbing pillow means formed of a synthetic compound resistant to an elastic compression and having a Shore hardness of about 0.5–4; a retaining member for keeping the pillow means in contact with a skin surface of the body region; and strap means for securing the retaining member to the body region.

2. A therapeutic device as set forth in claim 1, further comprising a moisture-permeable cover surrounding the pillow.

3. A therapeutic device as set forth in claim 1, wherein the synthetic compound comprises a vulcanized silicone rubber compound consisting of silicone rubber, hardener, and oil.

4. A therapeutic device as set forth in claim 1, wherein the synthetic material comprises a thermoplastic compound on a basis of styrene-ethylene-butylene-styrene-blockcopolymers.

* * * * *

UNITED STATES PATENT AND TRADEMARK OFFICE
CERTIFICATE OF CORRECTION

PATENT NO.      : 5,950,626

DATED           : September 14, 1999

INVENTOR(S)     : Markus Walther

It is certified that error appears in the above-identified patent and that said Letters Patent is hereby corrected as shown below:

Title page, insert the following:
  {73} Assignee:  Claus Wagener, Dietenhofen, Germany

Signed and Sealed this

Eleventh Day of April, 2000

Attest:

Q. TODD DICKINSON

*Attesting Officer*          *Director of Patents and Trademarks*